July 21, 1936. G. W. BAUGHMAN 2,048,318
RETARDATION CONTROL EQUIPMENT
Filed June 12, 1934
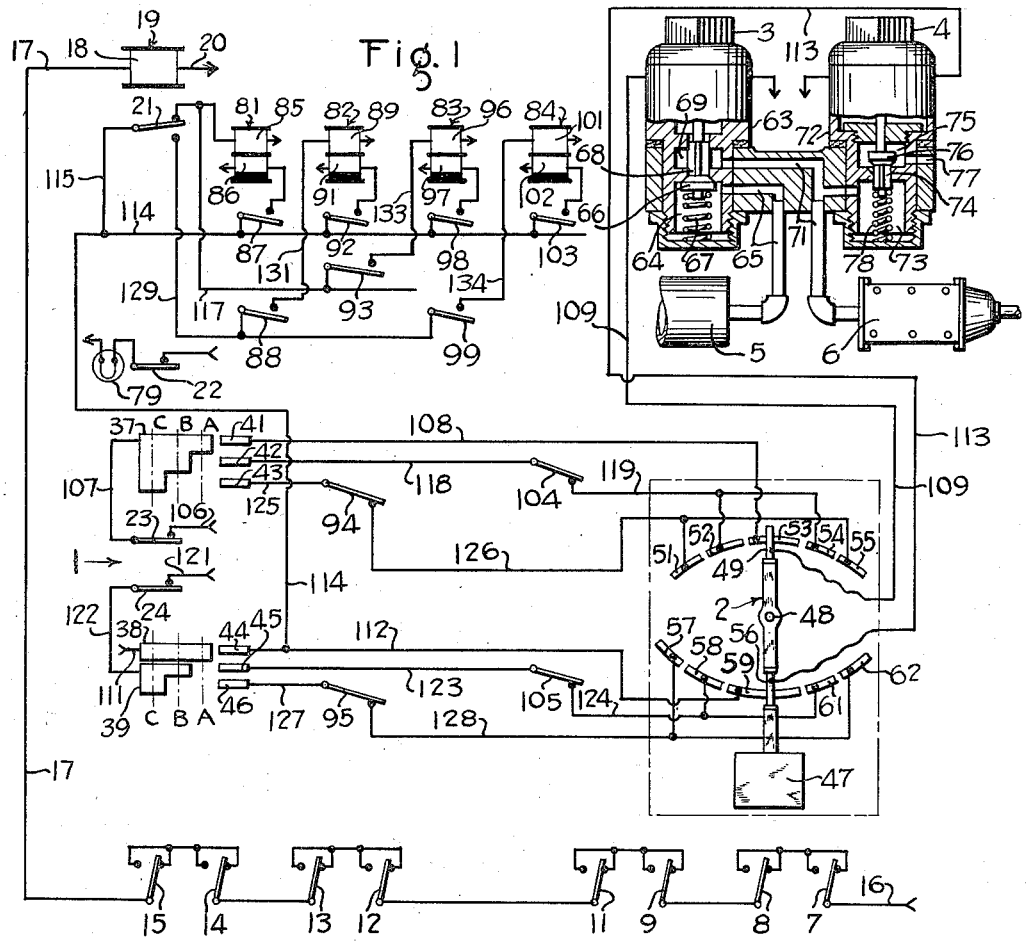
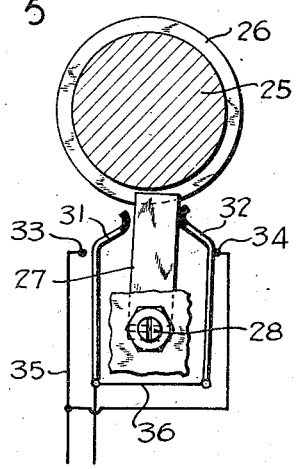
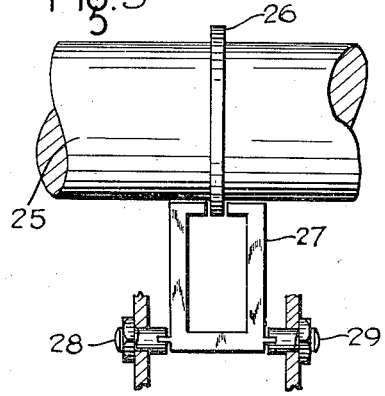
*INVENTOR*
GEORGE W. BAUGHMAN.
BY *Wm. M. Cady*
*ATTORNEY*

Patented July 21, 1936

2,048,318

UNITED STATES PATENT OFFICE 2,048,318

RETARDATION CONTROL EQUIPMENT

George W. Baughman, Edgewood, Pa., assignor to The Westinghouse Air Brake Company, Wilmerding, Pa., a corporation of Pennsylvania Application June 12, 1934, Serial No. 730,229

26 Claims. (Cl. 303—24)

My invention relates to fluid pressure brakes for vehicles, and more particularly to such equipment in which a selected rate of retardation is automatically decreased in the event of slipping of the wheels upon the rails.

In the operation of high speed trains and similar vehicles, it is desirable to provide a brake equipment having ample braking capacity to take care of the most rigid requirements that the equipment will be called upon to meet.

It is well known that, for a given braking pressure, friction type brakes are less effective in retarding the motion of a vehicle at high speeds than at low speeds, because the coefficient of friction between the rubbing parts is lower at high speeds than at low speeds. In order to bring a vehicle to a stop quickly it has been the usual practice for an operator to apply the brakes with a high degree of braking pressure at the high speeds, and, as the speed of the vehicle decreases, to so operate the brakes as to cause the braking pressure to decrease in such a manner that the vehicle is brought to a stop quickly and smoothly without dangerous shock, or skidding of the wheels. It has been proposed to accomplish such varying of the braking pressure automatically by employing retardation control aparatus for varying the braking pressure in accordance with a preselected rate of retardation.

This apparatus may comprise an inertia responsive device, such as a pendulum device that assumes varying positions in accordance with variations in the decelertion of the vehicle, and is adapted by means of electric circuits or otherwise to control the degree of brake application.

If a retardation controller is provided as above described, and is so arranged that the operator may select any one of a number of different rates of retardation for the vehicle, it may happen that the selected rate of retardation is, under specific conditions of operation, so great as to cause sliding of the wheels upon the rails.

It is an object of this invention to provide means for detecting when one or more pairs of wheels in a train or vehicle are sliding.

A further object of this invention is to provide a braking system in which a selected rate of retardation of the vehicle is reduced automatically in the event that the wheels slide.

Further advantages and objects of my invention will appear from the following description of a specific embodiment thereof taken in conjunction with the accompanying drawing in which—

Fig. 1 is a schematic view of apparatus and circuits comprising one preferred embodiment of my invention, and—

Figs. 2 and 3 are detail views of an axle responsive switch.

Referring to the drawing, a brake switch or controller 1 is provided for closing circuits through the contact members of a retardation controller 2, which may be of the pendulum type, for actuating application and release magnet valve devices 3 and 4 for controlling, respectively, the flow of air under pressure from the reservoir 5 to the brake cylinder 6, and from the brake cylinder 6 to the atmosphere. Switches 7, 8, 9, 11, 12, 13, 14, and 15 are provided, associated with the several axles of the vehicle and adapted upon movement of the vehicle in either direction to close a circuit from a source of power through the conductor 16, the several axle responsive switches 7 to 15, conductor 17, the coil 18 of the relay 19, and conductor 20 to the source of power. It is assumed in Fig. 1 that the vehicle there illustrated is provided with eight axles or pairs of wheels, but obviously any number may be provided. Upon closure of the above traced circuit, the several contact members 21, 22, 23, and 24 of the relay 19 are actuated to their upper or illustrated position for closing circuits to be later described.

The axle responsive switches 7 to 15 inclusive are responsive to the direction of rotation of the several axles of the vehicle. A suitable structure for such switches is illustrated in Figs. 2 and 3 in which a shaft 25 is provided that may be the axle connecting a pair of vehicle wheels or a motor shaft driven in accordance with the axle, and upon which a metallic ring 26 of magnetizable material is provided. A permanent magnet 27 is pivotally mounted in the trunnions 28 and 29, and is so positioned that an air cap at its upper end accommodates the metal ring 26 on the shaft 25. Contact fingers 31 and 32 normally bias the member 27 to its mid position corresponding to the open circuit position of the switch. Upon rotation of the shaft 25, in the one, or in the other direction, the ring 26 correspondingly rotates and creates eddy currents in the U-shaped magnet 27 tending to operate it in the one, or in the other direction. Such movement of the magnet 27 causes the contact finger 31 to be operated to engage the contact member 33, or the contact finger 32 to be operated to engage the contact member 34, thus completing a circuit between the conducting members 35 and 36.

The controller 1 comprises movable contact segments 37, 38 and 39 and fixed contact members 41 to 46 inclusive. The contact members 41, 42 and 43 are adapted to be engaged by the contact segment 37, the contact segment 38 is adapted to engage the contact member 44, and the contact segment 39 is adapted to engage the contact members 45 and 46.

The retardation controller 2 comprises a pendulum 47 mounted upon a pivot 48 and carrying, at its upper end, a contact member 49 that is adapted to engage one of the application contact members 51, 52, 53, 54 or 55, for controlling the operation of the application magnet valve device 3. A second movable contact member 56 is carried by pendulum 47 and is adapted to engage one of the release contact members 57, 58, 59, 61, or 62 to control the operation of the release magnet valve device 4.

The application magnet valve device 3 comprises a casing 63 that encloses a valve chamber 64, connected by port and pipe 65 to the reservoir 5, and contains a valve 66 that is normally biased upwardly by a spring 67 to close a port 68 connecting the valve chamber 64 with an outlet chamber 69, connected by the port and pipe 71 to the brake cylinder 6.

The release magnet valve device 4 comprises a casing 72 enclosing an inlet chamber 73, that is connected by a port 74 to a valve chamber 75 that contains a valve 76, and is connected to the atmosphere through an exhaust port 77. The valve 76 is biased upwardly to its unseated or illustrated position by a spring 78.

Upon starting the vehicle and energizing the relay winding 18, the contact member 22 is actuated upwardly and closes a signal circuit through a lamp 79, indicating that the relay 19 is energized and that all the wheels of the vehicle or train are rolling on the rails. The relay 19 controls a group of relays 81, 82, 83 and 84 for purposes to be later described. The relay 81 comprises an operating coil 85, a time delay holding coil 86, and contact members 87 and 88. The relay 82 comprises an operating coil 89, a time delay holding coil 91, and contact members 92, 93, 94 and 95. The relay 83 comprises an operating coil 96, a time delay holding coil 97, and contact members 98 and 99. The relay 84 comprises an operating coil 101, a time delay holding coil 102, and contact members 103, 104 and 105.

Upon operation of the controller 1 to it first operative position, indicated by the dotted line "A", the contact member 41 engages the contact segment 37 closing a circuit from a source of power through conductor 106, contact member 23 of the relay 19, conductor 107, contact members 37 and 41, conductor 108 to the contact segment 53 on the retardation controller, the movable contact member 49, conductor 109, and through the winding of the application magnet valve device 3 back to the source of power. This energization of the magnet valve device moves the valve 66 downwardly thus permitting the flow of air under pressure from the reservoir 5 through pipe and port 65, application valve chamber 64, port 68, chamber 69, port and pipe 71, to the brake cylinder 6. At the same time the contact segment 38 engages the contact finger 44, closing a circuit from a source of power through conductor 111, contact members 38 and 44, conductor 112 to the conducting segment 59 of the retardation controller 2, through contact member 56, conductor 113, the winding of the release magnet valve device 4, and back to the source of power. The energization of this circuit causes the release valve 76 to be actuated downwardly to its closed position against the pressure of the spring 78 thus preventing escape of pressure from the brake cylinder 6 to the atmosphere.

Upon engagement of the contact members 38 and 44, another circuit is completed through these members and through conductors 114, 115, contact 21 of the relay 19 in its illustrated position, the operating winding 85 of the relay 81, thus energizing the relay 81 and moving its contact members 87 and 88 upwardly to their circuit closing positions. The contact member 87, in its upper or circuit closing position, energizes the holding coil 86 of the relay 81 which has a time delay release characteristic so that the relay will not immediately open the circuit through its contact members 87 and 88 upon deenergization of the holding coil 86. The contact member 88 prepares a circuit for energizing the winding 89 of the relay 82 upon movement of the contact member 21 of the relay 19 to its lower position.

With the controller 1 in its first operative position, the retardation controller 2 will effect a degree of application of the brake depending upon the position of the pendulum 47 required to cause separation between the cooperative pairs of contact members 49 and 53, and 56 and 59. Upon separation of the pair of contact members 49 and 53 the winding of the application magnet valve device 3 is deenergized, permitting the valve to seat and shut off further flow of air from the reservoir 5 to the brake cylinder 6. Upon separation of the contact members 56 and 59 the winding of the release magnet valve device 4 is deenergized permitting the valve to open and release air under pressure from the brake cylinder 6 to the atmosphere, thus releasing the brakes.

If the operator desires a greater degree of retardation of the vehicle, the controller 1 is moved to its second operative position, indicated by the dotted line B thus causing engagement of the contact segment 37 with the contact member 42, which completes a circuit through conductor 118, contact member 104 of the relay 84, conductor 119 to the conducting segments 52 and 54 of the retardation controller. If now the retardation controller moves the contact member 49 beyond a position whereby it will be in engagement with the contact segment 53, it will not interrupt the circuit through the winding of the application magnet valve device 3 since this circuit will now be completed through the contact segment 52, or the contact segment 54. In the second position of the controller 1, the contact segment 39 engages the contact segment 45, thus completing a circuit from a source of power, through conductor 121, the contact member 24 of the relay 19, conductor 122, contact members 39 and 45, conductor 123, contact member 105 of the relay 84, and conductor 124 to the contact segments 58 and 61 of the retardation controller. Should the retardation controller now move the contact member 58 beyond its point of engagement with the contact segment 59, it would engage the contact segment 58, or the contact segment 61, thus maintaining the circuit through the winding of the release magnet valve device 4 energized. In the second position of the controller 1 it is therefore necessary for the retardation controller to move the contact member 49 beyond engagement with the contact segment 52 or 54 and the contact member 56 beyond engagement with the contact segment 58 or 61 on order to release the brakes. A greater rate of retardation is therefore provided in the second controller position than in the first controller position.

If the operator desires a still greater rate of retardation of the vehicle, the controller 1 is placed in its third operative position indicated by the letter C. In this position of the controller, the contact segment 37 engages the contact member 43 and connects it through conductor 125, contact member 94 of the relay 82, and conductor 126 to the segments 51 and 55 of the retardation controller. At the same time the contact segment 39 engages the contact member 46 connecting it through conductor 127, contact member 95 of the relay 82, and conductor 128 to the segments 57 and 62 on the retardation controller. The contact segments 51 to 55, controlling the application magnet valve device 3, are sufficiently close together so that the contact member 49 in passing from one segment to the next would engage the segment toward which it is passing before separating from the segment that it is leaving. This is true also of the movement of the contact member 56 over the release contact segments 57, 58, 59, 61 and 62. While three positions only of the controller 1 are shown with the appropriate number of conducting segments on the retardation controller 2, obviously any number of controller steps, corresponding to different rates of retardation may be employed, with the corresponding circuits from the manually operated controller to the retardation controller.

The width of the contact segments engaged by the contact member 49 of the retardation controller, and also of the segments engaged by the contact member 56, are such as to correspond with the desired rates of retardation controlled by the several steps of the retardation controller. For example, with the three steps of retardation provided in controller 2, the width of the contact segment may be so selected as to provide for a rate of retardation of 3, 4 and 5 miles per hour per second, respectively.

If the operator places the controller 1 in its third position, effecting a maximum rate of retardation of the vehicle, the brake will be operated in the manner above described by circuits extending through the contact members of the manually operated controller 1 and the contact members of the retardation controller 2, unless and until one pair of wheels of the vehicle reduces its speed, as by slipping on the rails sufficiently so that the magnetic drag existing between the ring 26 and the U-shaped magnet 27 becomes insufficient to maintain said switch in its circuit closing position. Upon operation of any of the switches 7 to 15 to their circuit interrupting positions, the relay 19 becomes deenergized and the several contact members 21, 22, 23, and 24 thereof drop to their lower positions. The contact members 23 and 24 interrupt the circuits through the retardation controller to the application magnet valve device and release magnet valve device, respectively, thus releasing the brakes. The contact member 22 interrupts the circuit through the signal lamp 79 notifying the operator that the circuit to the relay 19 has been interrupted. The dropping of the contact member 21 of the relay 19 to its lower position completes a circuit through conductor 129, contact member 88 of relay 81, conductor 131 and the operating winding 89 of the relay 82, thus energizing relay 82 and causing it to move its contact members 92, 93, 94 and 95 upwardly. The contact member 92 completes a circuit through the holding coil 91 of relay 82, and the contact member 93 prepares a circuit for energizing the operating winding 96 of relay 83 through conductors 117 and 133 when the contact member 21 of the relay 19 is again actuated to its upper circuit closing position. The contact member 94, when actuated upwardly, interrupts the circuit to the conducting segments 51 and 55 of the retardation controller for controlling the application magnet valve to maintain the highest step of retardation, and the contact member 95 interrupts the circuit to the segments 57 and 62 on the retardation controller which control the operation of the release magnet valve for the highest rate of retardation. The highest rate of vehicle retardation now permitted by the controller 2 is that which is effected by engagement of the contact member 49 with the contact members 52 and 54 and engagement of the contact member 56 with the contact members 58 and 61. A swing of the pendulum 47 beyond the position required to maintain engagement between above enumerated cooperating contact members causes deenergization of the application magnet valve device 3 and of the release magnet valve device 4, since the contact segments 51, 55, 57 and 62 on the retardation controller are now dead.

Since interruption of the circuit to the relay 19 by operation of one of the axle driven switches 7 to 15 causes the circuit to the application magnet valve device 3 and to the release magnet valve device 4 to be interrupted through contact members 23 and 24, respectively, of the relay 19, the wheels will again roll on the rails. The axle driven switches are again closed and the coil 18 of the relay 19 is again energized, causing the relay to operate its several contact members 21, 22, 23, and 24 to their upper positions. The brakes are, therefore, again applied at a rate depending upon the operation of the retardation controller to effect the next lower step of retardation, the signal lamp 79 is lighted, and the operating winding 96 of the relay 83 is energized from a circuit extending through the contact member 21, conductor 117, contact member 93 of relay 82, and conductor 133, causing the relay 83 to actuate its contact members 98 and 99 upwardly to their circuit closing positions. The contact member 98 so actuated closes a circuit through the holding coil 97 of the relay 83, and the contact member 99 prepares a circuit for energizing the operating winding 101 of the relay 84 upon movement of the contact member 21 to its lower position.

If the rate of application of the brakes is still so great as to cause slipping of any of the wheels upon the rails, the corresponding axle responsive switch of the switches 7 to 15, operates to again interrupt the circuit energizing the relay 19. Upon being deenergized the relay 19 interrupts the circuits through the contact members 23 and 24 thereof, interrupting the energization of the magnet valve devices 3 and 4, the contact member 22 again extinguishes the signal lamp 79, and the contact member 21 completes a circuit through conductor 129, contact member 99 of the relay 83 in its now closed position, and conductor 134 to the operating winding 101 of relay 84 actuating its contact members 103, 104 and 105 upwardly. The contact member 103 closes a circuit through the holding coil 102, and the contact members 104 and 105 interrupt circuits to the segments 52 and 54, and to the segments 58 and 61, respectively, on the retardation controller thus preventing the retardation controller from applying the brakes in excess of their lowest rate of brake application.

Upon release of the brakes resulting from operation of the relay 19, when deenergized, the wheels again roll on the rails and the winding 18 of the relay 19 is again energized moving the several contact members 21, 22, 23, and 24 upwardly. The retardation controller again becomes effective to regulate the application of the brakes the range of application being now limited to that corresponding to engagement of the contact members 49 and 53, and of contact members 56 and 59. It will be noticed that upon energization of any of the holding coils 86, 91, 97, 102 of the several relays 81, 82, 83 and 84, respectively, these coils remain energized until the circuit through the contact members 38 and 44 of the controller 1 is interrupted by operation of the controller 1 to its brake releasing position.

It will be noted that, when the vehicle comes to rest while the controller 1 is in a brake applying position, and the relay 19 is deenergized causing the several contact members 21, 22, 23 and 24 thereof to drop to their lower positions, the circuits through the controller segments 37 and 39 are interrupted. The several retardation controller contact members 51, 52, 53, 54, and 55 that control the application magnet valve device 3 are therefore made dead causing the valve 66 to seat, and the retardation controller contact members 57, 58, 61 and 62 are also made dead. The winding of the release magnet valve device 4 is however maintained energized by the circuit through controller contact segment 38 and contact finger 44, conductor 112, contact members 59 and 56 of the retardation controller, and conductor 113, the pendulum 47 assuming a vertical position as soon as the vehicle stops. The valves 66 and 76 are, accordingly, held in lap position.

While I have illustrated and described one preferred embodiment of my invention it will be apparent that many modifications thereof, within the spirit of my invention, will occur to those skilled in the art, and I do not wish to be limited otherwise than by the scope of the appended claims.

Having now described my invention, what I claim as new and desire to secure by Letters Patent is:

1. In a brake equipment for vehicles, in combination, braking means, a retardation controller responsive to the rate of deceleration of said vehicle for controlling the degree of application of said braking means, manual means for selecting a predetermined rate of retardation of the vehicle, and means responsive to the slipping of the wheels for automatically changing the setting of the retardation controller to effect a predetermined reduction in the rate of retardation of the vehicle.

2. In a brake equipment for vehicles, in combination, braking means, a retardation controller responsive to the rate of deceleration of said vehicle for controlling the degree of application of said braking means, manual means for selecting a predetermined rate of retardation of the vehicle, and means responsive to the slipping of the wheels for automatically reducing the selected rate of retardation of the vehicle.

3. In a brake equipment for vehicles, in combination, braking means, a retardation controller responsive to the rate of deceleration of said vehicle for controlling the degree of application of said braking means, manual means for selecting a predetermined rate of retardation of the vehicle, and means responsive to rotation of the wheels of said vehicle at less than a predetermined rate for automatically reducing the selected rate of retardation of the vehicle a definite amount.

4. In a brake equipment for vehicles, in combination, braking means, a retardation controller responsive to the rate of deceleration of said vehicle for controlling the degree of application of said braking means, manual means for selecting a predetermined rate of retardation of the vehicle, and means responsive to rotation of the wheels of the vehicle at less than a predetermined rate for automatically reducing the selected rate of retardation of the vehicle a definite amount, and, upon a second decrease in the rate of rotation of the wheels of the vehicle, for automatically reducing the selected rate of retardation of the vehicle a further definite amount.

5. In a brake equipment for vehicles, in combination, braking means, a retardation controller responsive to the rate of deceleration of said vehicle for controlling the degree of application of said braking means, means responsive to the slipping of the wheels for automatically effecting a predetermined reduction in the rate of retardation of the vehicle, and signal means responsive to slipping of the wheels of the vehicle.

6. In a brake equipment for vehicles, in combination, braking means, a retardation controller responsive to the rate of deceleration of said vehicle for controlling the degree of application of said braking means, manual means for selecting a predetermined rate of retardation of the vehicle, means responsive to the slipping of the wheels for automatically effecting a predetermined reduction in the rate of retardation of the vehicle and signal means responsive to a predetermined decrease in the rate of rotation of the wheels of the vehicle.

7. In a brake equipment for vehicles, in combination, braking means, a retardation controller responsive to the rate of deceleration of said vehicle for controlling the degree of application of the braking means in accordance with a selected one of a plurality of retardation steps, manual means for applying the brake in accordance with a selected step, and means responsive to the slipping of the wheels for automatically changing the setting of the retardation controller to the next lower step.

8. In a brake equipment for vehicles, in combination, braking means, a retardation controller responsive to the rate of deceleration of said vehicle for controlling the degree of application of the brake and provided with a plurality of steps of retardation control, manual means for applying the braking means in any selected step of retardation control, and means for automatically effecting the next lower step of retardation control and for signalling the operator upon slipping of the wheels of the vehicle.

9. In a brake equipment for vehicles, in combination, braking means, a retardation controller responsive to the rate of deceleration of said vehicle for controlling the degree of application of the braking means and provided with a plurality of steps of retardation control, manual means for applying the brake in any selected step of retardation control, and means responsive to the slipping of any of the wheels of the vehicle for automatically selecting the next lower step of retardation control.

10. In a brake equipment for vehicles, in combination, braking means, a retardation controller responsive to the rate of deceleration of said vehicle for controlling the degree of application of the braking means and provided with a plurality of steps of retardation control, manual means for applying the brake in any selected step of retardation control, and means responsive to a predetermined decrease in the rate of rotation of the wheels of the vehicle for automatically releasing the braking means and selecting the next lower step of retardation control.

11. In a brake equipment for vehicles, in combination, braking means, a retardation controller responsive to the rate of deceleration of said vehicle for controlling the degree of application of the braking means and provided with a plurality of steps of retardation control, manual means for applying the braking means in any selected step of retardation control, and means responsive to securing predetermined decreases in the rate of rotation of the vehicle wheels for reducing the selected rate of retardation step by step.

12. In a brake equipment for vehicles, in combination, braking means, magnet valves for controlling the application and release of the braking means, means including a plurality of electric circuits for controlling the degree of application of the brakes in accordance with a selected one of a plurality of retardation steps, a retardation controller of the inertia type responsive to the rate of deceleration of said vehicle and provided with electric contacts for operating said magnet valves to control the degree of application of the braking means in accordance with a selected one of said steps, and manual means for effecting the energization of a selected number of circuits for applying the brakes in accordance with a selected step.

13. In a brake equipment for vehicles, in combination, braking means, electrically operated valves for controlling the application and release of the braking means, means including a plurality of electric circuits for effecting the energization of said electrically operated valves to control the degree of application of the brakes in accordance with a selected one of a plurality of retardation steps, a retardation controller of the inertia type responsive to the rate of deceleration of said vehicle and provided with electric contacts for also controlling the operation of said valves to control the degree of application of the braking means and provided with a plurality of steps of retardation control, manual means for applying the brakes in any selected step of retardation control, and means for signalling the operator upon slipping of the wheels of the vehicle.

14. In a brake equipment for vehicles, in combination, braking means, electrically operated valves for controlling the application and release of the braking means, a retardation controller of the inertia type responsive to the rate of deceleration of said vehicle and provided with electric contacts for operating said magnet valves to control the degree of application of the brake and provided with a plurality of steps of retardation control, manual means for applying the brake in any selected step of retardation control, and means responsive to a predetermined decrease in the rate of rotation of the wheels of the vehicle for automatically releasing the braking means and selecting the next lower step of retardation control.

15. In a brake equipment for vehicles, in combination, braking means, electrically operated valves for controlling the application and release of said braking means, a retardation controller of the inertia type responsive to the rate of deceleration of the vehicle and provided with electric contacts for operating said valves to control the degree of application of the braking means and provided with a plurality of steps of retardation control, manual means for applying the braking means in any selected step of retardation control, and means responsive to recurring predetermined decreases in the rate of rotation of the wheels for reducing the selected rate of retardation of the vehicle step by step.

16. In a brake equipment for vehicles, in combination, braking means, electrically operated valves for controlling the application and release of the braking means, a retardation controller of the inertia type responsive to the rate of deceleration of said vehicle for controlling the degree of application of the braking means and provided with a plurality of contact members for controlling said electrically operated valves to effect a plurality of steps of retardation control, manual means for applying the brake in any selected step of retardation control, and relay means actuated upon a predetermined decrease in the rate of rotation of the wheels of the vehicle for automatically interrupting the circuit through certain of said contact members for reducing the selected rate of retardation control.

17. In a brake control equipment for vehicles, in combination, circuit closing devices associated with the several vehicle axles, means for operating said several circuit closing devices to circuit closing positions when the associated axle is rotating above a given speed and to circuit interrupting positions when the speed of the axle falls below a given speed, a relay, an operating circuit for said relay including all of said circuit closing devices in series, and means responsive to the deenergization and subsequent energization of the relay while the brakes are applied to reduce the intensity of the brake application.

18. In a brake control equipment for vehicles, in combination, circuit closing devices associated with the several vehicle axles, means for operating said several circuit closing devices to circuit closing positions when the associated axle is rotating above a given speed and to circuit interrupting positions when the speed of the axle falls below a given speed, a relay, an operating circuit for said relay including all of said circuit closing devices in series, manually operable means including cooperating controller contact members for effecting application of the brakes, said contact members being in, or out, of engagement in accordance as said manually operable means is, or is not, in brake applying position, a second and a third relay, an operating circuit for said second relay including said controller contact members and a contact member of said first relay, a holding circuit for said second relay including said controller contact members, an operating circuit for said third relay including said controller contact members, a contact member of said first relay and a contact member of said second relay, and means operative when said third relay becomes energized to reduce the intensity of the brake application.

19. In a brake equipment for vehicles, in combination, a brake cylinder, valve means for controlling the flow of fluid under pressure to and from said brake cylinder, manually operable means for effecting application of the brakes, a retardation controller responsive to the rate of deceleration of the vehicle for controlling the degree of application of the brakes, and means for maintaining said valve means in lap position when the vehicle is at rest and the manually operable means is in a brake applying position.

20. In a brake equipment for vehicle, in combination, a brake cylinder, valve means for controlling the flow of fluid under pressure to and from said brake cylinder, manually operable means for effecting application of the brakes, a retardation controller responsive to the rate of deceleration of the vehicle for decreasing the degree of application of the brakes, and relay means operative upon the stopping of the vehicle for preventing an increase in the degree of application of the brakes.

21. In a brake equipment for vehicles, in combination, a brake cylinder, valve means for controlling the flow of fluid under pressure to and from said brake cylinder, manually operable means for effecting application of the brakes, a retardation controller responsive to the rate of deceleration of the vehicle for controlling the degree of application of the brakes, relay means operative upon the stopping of the vehicle for preventing the flow of fluid under pressure to said brake cylinder, and means for preventing the flow of fluid under pressure from said brake cylinder while said manually operable means is in a brake applying position.

22. In a brake equipment for vehicles, in combination, braking means, magnet valve devices for controlling the application and release of the braking means, means including a plurality of electric circuits for controlling the degree of application of the brakes in accordance with a selected one of a plurality of retardation steps, manually operable means for connecting a selected number of said circuits to a source of electric energy for effecting the energization of said magnet valve devices, a retardation controller of the inertia type responsive to the rate of deceleration of the said vehicle and provided with electric contacts for connecting said magnet valve devices to selected conductors in accordance with the rate of retardation of the vehicle to control the degree of application of the braking means in accordance with a selected one of said steps.

23. In a brake equipment for vehicles, in combination, braking means, magnet valve devices for controlling the application and release of the braking means, means for controlling the degree of application of the brakes in accordance with a selected one of a plurality of retardation steps including a plurality of electric circuit conductors, manually operable means for connecting a selected number of said conductors to a source of electric energy for effecting the energization of said magnet valve devices, a retardation controller comprising contact members connected, respectively, to said several conductors, and means responsive to the rate of retardation of the vehicle for connecting said magnet valve device to selected ones of said electric conductors.

24. In a brake equipment for vehicles, in combination, braking means, an application magnet valve device and a release magnet valve device for controlling the application and release of the braking means, means for controlling the degree of application of the brakes in accordance with a selected one of a plurality of retardation steps including a plurality of circuit conductors for controlling the energization of said application magnet valve device and a plurality of circuit conductors for controlling the energization of said release magnet valve device, manually operable means for connecting selected pairs of said conductors to a source of electric energy corresponding to the desired maximum rate of retardation of the vehicle, a retardation controller of the inertia type responsive to the rate of deceleration of the vehicle and provided with electric contact members connected respectively to said several electric conductors and corresponding to steps of retardation control, and means responsive to the operation of said retardation controller in response to changes in the rate of retardation of the vehicle for selectively connecting said application magnet valve device and said release magnet valve device to retardation control contact member corresponding to the speed of the vehicle.

25. In a brake equipment for vehicles, in combination, braking means, an application magnet valve device and a release magnet valve device for controlling the application and release of the braking means, means for controlling the degree of application of the brakes in accordance with a selected one of a plurality of retardation steps including a plurality of circuit conductors for controlling the energization of said application magnet valve device and a plurality of circuit conductors for controlling the energization of said release magnet valve device, manually operable means for connecting selected pairs of said conductors to a source of electric energy corresponding to the desired maximum degree of retardation of the vehicle, a retardation controller of the inertia type responsive to the rate of deceleration of the vehicle and provided with electric contact members connected respectively to said several electric conductors and corresponding to steps of retardation control, and means responsive to the operation of said retardation controller in response to changes in the rate of retardation of the vehicle for selectively connecting said application magnet valve device and said release magnet valve device to retardation control contact members corresponding to the speed of the vehicle, switch contact members connected in said several conductors between said manually operable device and said retardation controller, and means responsive to the sliding of the vehicle wheels for automatically operating said switches to interrupt the circuits through said conductors to effect a predetermined reduction in the rate of retardation of the vehicle.

26. In a brake equipment for vehicles, in combination, braking means, magnet valve devices for controlling the application and release of the braking means, means for controlling the degree of application of the brakes in accordance with a selected one of a plurality of retardation steps including a plurality of electric circuit conductors, manually operable means for connecting a selected number of said circuit conductors to a source of electric energy, a retardation controller of the inertia type responsive to the rate of deceleration of said vehicle and provided with a plurality of contact members connected, respectively, to said several conductors, means responsive to the rate of retardation of the vehicle for connecting said magnet valve devices to selected ones of said electric conductors, switch contact members connected in said several conductors between said manually operable device and said retardation controller, and means responsive to the slipping of the wheels for automatically operating said switches in a step by step manner to progressively interrupt the circuits through said conductors to progressively effect a predetermined step by step reduction in the rate of retardation of the vehicle.

GEORGE W. BAUGHMAN.

CERTIFICATE OF CORRECTION.

Patent No. 2,048,318.                                             July 21, 1936.

GEORGE W. BAUGHMAN.

It is hereby certified that error appears in the printed specification of the above numbered patent requiring correction as follows: Page 5, first column, line 25, claim 11, for the word "securing" read recurring; page 6, first column, line 12, claim 20, for "vehicle" read vehicles; and that the said Letters Patent should be read with these corrections therein that the same may conform to the record of the case in the Patent Office.

Signed and sealed this 2nd day of March. A. D. 1937.

(Seal)                                                  Henry Van Arsdale
                                                          Acting Commissioner of Patents.